No. 742,683. PATENTED OCT. 27, 1903.
J. P. LANGE.
PROPELLING DEVICE FOR VEHICLES.
APPLICATION FILED MAY 14, 1903.
NO MODEL. 2 SHEETS—SHEET 2.
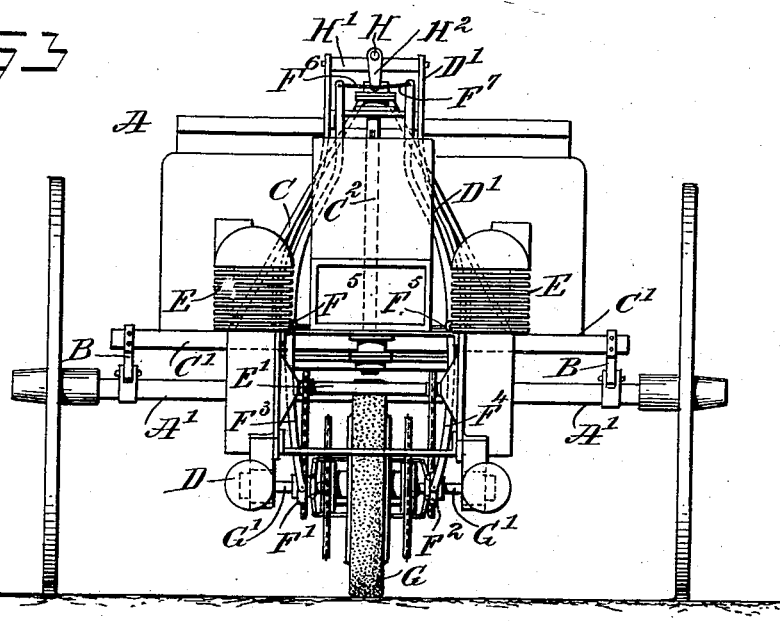
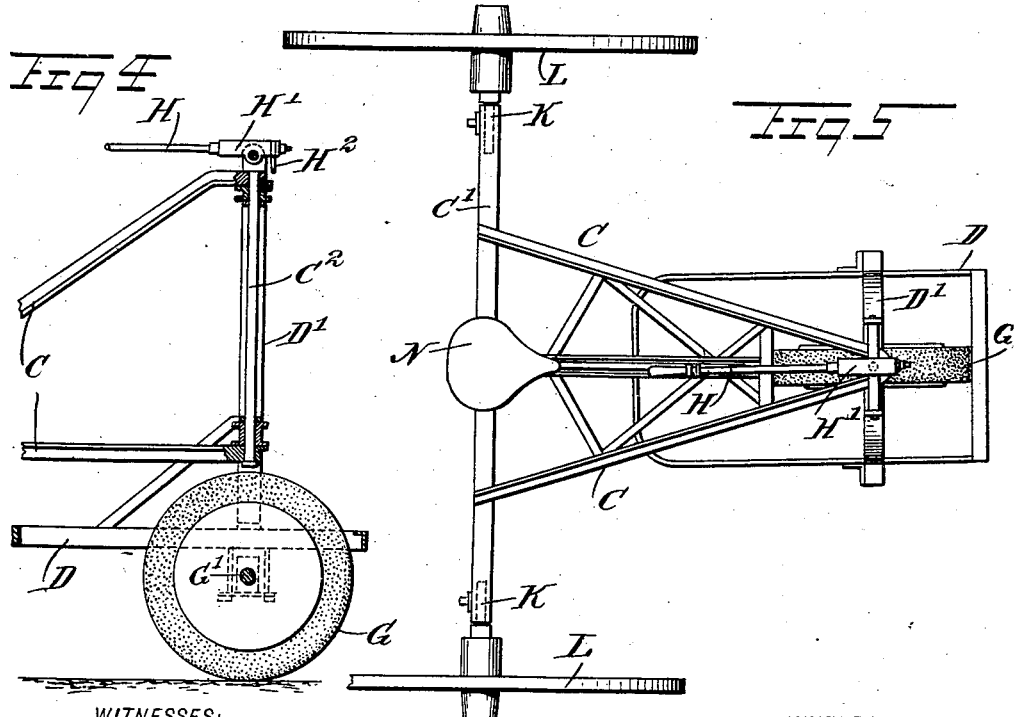
WITNESSES:
H. Walker
INVENTOR
Jürgen P. Lange
BY
ATTORNEYS.

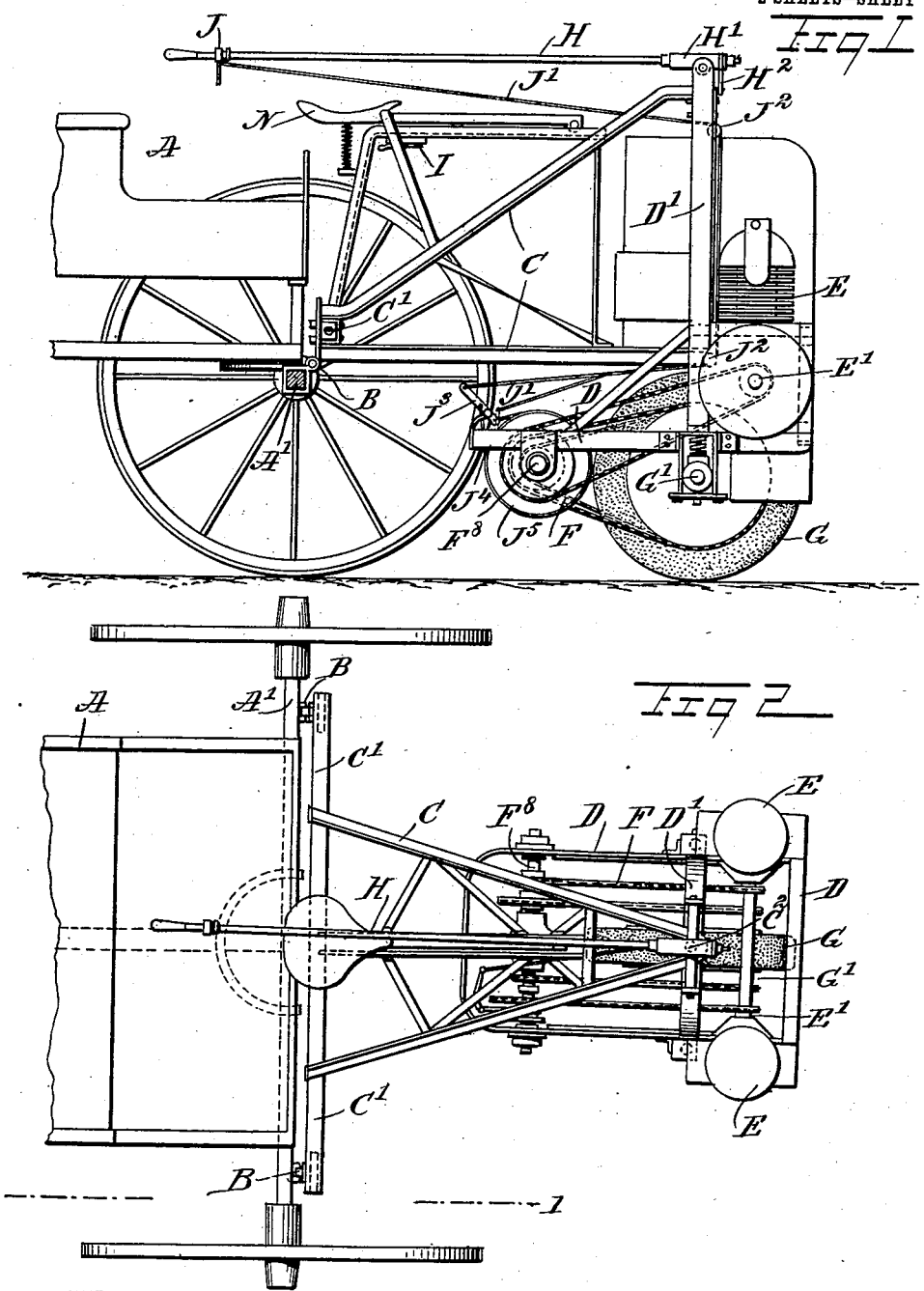

No. 742,683.

Patented October 27, 1903.

UNITED STATES PATENT OFFICE.

JÜRGEN PETER LANGE, OF PASSAIC, NEW JERSEY.

PROPELLING DEVICE FOR VEHICLES.

SPECIFICATION forming part of Letters Patent No. 742,683, dated October 27, 1903.

Application filed May 14, 1903. Serial No. 157,085. (No model.)

*To all whom it may concern:*

Be it known that I, JÜRGEN PETER LANGE, a citizen of the United States, and a resident of Passaic, in the county of Passaic and State of New Jersey, have invented a new and Improved Propelling Device for Vehicles, of which the following is a full, clear, and exact description.

The object of the invention is to provide a new and improved propelling device for vehicles which is simple and durable in construction, very effective in operation, and arranged for convenient and quick attachment to an ordinary road-wagon, buggy, or like vehicle, the propelling machinery being separated and spaced from the vehicle for convenient access to the working parts.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement, the axle being shown in section on the line 1 1 of Fig. 2. Fig. 2 is a plan view of the same. Fig. 3 is a front elevation of the same. Fig. 4 is a sectional side elevation of the driven wheel, the main frame, and the auxiliary frame in which the driven wheel is journaled; and Fig. 5 is a plan view of the improvement arranged as a tricycle, the motor and gearing being omitted.

The front axle A' of a road-vehicle A, such as a buggy or the like, is coupled by a suitable thill-coupling B to the cross-bar C' of the main frame C, carrying at its front end a vertically-disposed pivot $C^2$, on which is mounted to turn the vertical member D' of an auxiliary frame D, supporting one or more motors E, having their common main shaft E' connected by differential or other gears F with the shaft G' of a driven wheel G, journaled in suitable bearings carried by the auxiliary frame D.

On the upright member D' of the auxiliary frame D is pivoted a sleeve H', in which is mounted to turn a steering-bar H, extending rearward to the vehicle A to be within convenient reach of the operator seated in the vehicle A to enable the operator to move the steering-bar sidewise for conveniently turning the auxiliary frame D on its pivot $C^2$ for steering the propelling device in the desired direction.

The differential gear F is provided with a high-speed gear and a low-speed gear, having clutches F' $F^2$ for connecting either of the said high or low speed gears with the shaft G' of the drive-wheel G. For this purpose the clutches F' $F^2$ are engaged by shifting levers $F^3$ $F^4$, fulcrumed at $F^5$ on the auxiliary frame D' and connected at their upper ends by links $F^6$ $F^7$ with an arm $H^2$ on the forward end of the steering-bar H, so that when the latter is turned in its sleeve H' then the arm $H^2$ by the links $F^6$ $F^7$ imparts a swinging motion to the shifting levers $F^3$ $F^4$, so that one clutch is moved out of action and the other into action—that is, the high-speed or the low-speed gear is connected with the shaft G' to rotate the drive-wheel G at the desired speed.

The detail construction of the high and low speed gears and the clutches may be of any approved construction, so that further detailed description thereof is not deemed necessary.

The starting and stopping of the motors E is accomplished by a suitable switch mechanism I, arranged on the frame C, adjacent to the vehicle A to be within convenient reach of the occupant of the vehicle, the said switch mechanism controlling the electric sparking plug of the motor if an explosion-engine is used, or in case a storage battery is employed the switch mechanism controls the current to the dynamos of the motor or motors. The brake mechanism is also under the control of the occupant of the vehicle A, and for this purpose the handle end of the steering-bar H is provided with a slide J, connected with one end of a band or cord J', extending over pulleys $J^2$ on the auxiliary frame D' to connect with one end of a brake-lever $J^3$, fulcrumed on the auxiliary frame D'. The ends of a brake-band $J^4$ are connected with the brake-lever $J^3$ at opposite sides of the fulcrum of the brake-lever, and the said band engages the peripheral face of a brake-wheel $J^5$, preferably secured on the counter-shaft $F^8$ of the differential gear F. By shifting the slide J rearward the brake-band J⁴ is drawn firmly around the brake-wheel J⁵ to brake the differential gear, and hence the drive-wheel G, which turns backward until the slide J is moved forward, releasing the brake, which stops the vehicle from going backward.

The auxiliary frame D is preferably constructed for supporting two motors E, one on each side of the driven wheel G, to give the necessary traction to the latter.

When it is desired to use the propelling device as a tricycle, (see Fig. 5,) then the cross-bar C' of the main frame C is uncoupled from the axle A', and the said cross-bar C' is then provided at its ends with spindles K to transform the cross-bar into an axle, and on the said spindles K are mounted wheels L, traveling on the ground. The steering-bar H in this case is shortened, so as to be within convenient reach of the operator seated on the seat N, carried by the main frame C.

Having thus described my invention, I claim as new and desire to secure by Letters Patent—

1. The combination with a vehicle, of a main frame having its rear cross-bar coupled directly to the front axle of the vehicle, an auxiliary frame mounted to turn on the said main frame, a drive-wheel journaled on the said auxiliary frame, a motor mounted on the auxiliary frame and connected with the said drive-wheel, for rotating the latter, and a steering-bar mounted on the auxiliary frame and extending rearwardly to the vehicle for turning the said auxiliary frame on the main frame by a person seated in the said vehicle, as set forth.

2. The combination with a vehicle, of a main frame coupled to the front axle of the vehicle, an auxiliary frame mounted to turn on the said main frame, a drive-wheel journaled on the said auxiliary frame, a motor mounted on the auxiliary frame, a differential gearing for connecting the said motor with the said drive-wheel, a steering-bar mounted to turn in the auxiliary frame and extending to the vehicle for turning the said auxiliary frame, and a connection between the steering-bar and the differential gearing for shifting the said differential gearing, as set forth.

3. In a propelling device for vehicles, the combination with a main frame, and an auxiliary frame mounted to turn on the main frame, of a drive-wheel journaled in the auxiliary frame, a motor on the auxiliary frame, differential gearing for connecting the motor with the drive-wheel, clutches for the differential gearing, a steering-bar mounted in the auxiliary frame to turn and provided with an arm at its front end, shifting levers connected with the clutches, and links connecting the said levers with the arm on the steering-bar, as set forth.

4. A propelling device for vehicles, comprising a main frame, having a cross-bar, spindles for removable connection with the ends of the said cross-bar, wheels on the said spindles, an auxiliary frame mounted to swing horizontally on the front end of the said main frame, a drive-wheel journaled in the said auxiliary frame, and a motor mounted on the auxiliary frame and connected with the said drive-wheel, as set forth.

5. A propelling device for vehicles, comprising a main frame having a cross-bar, spindles for removable connection with the ends of the said cross-bar, wheels on the said spindles, an auxiliary frame mounted to swing horizontally on the front end of the said main frame, a drive-wheel journaled in the said auxiliary frame, a motor mounted on the auxiliary frame and connected with the said drive-wheel, a saddle on the said main frame, and a steering-bar on the said auxiliary frame, as set forth.

6. The combination with a vehicle, of a main frame coupled to the front axle of the vehicle, an auxiliary frame mounted to turn on the said main frame, a drive-wheel journaled on the said auxiliary frame, a motor mounted on the auxiliary frame, a differential gearing for connecting the said motor with the said drive-wheel, a steering-bar for turning the said auxiliary frame and for shifting the said differential gearing, and a brake mechanism for the said differential gearing, having an operating device in the said steering-bar, as set forth.

7. The combination with a vehicle, of a main frame coupled to the front axle of the vehicle, an auxiliary frame mounted to turn on the said main frame, a drive-wheel journaled on the said auxiliary frame, a motor mounted on the auxiliary frame and connected with the said drive-wheel, for rotating the latter, and a starting and stopping device for the motor, arranged on the said main frame, to be within convenient reach of a person seated in the vehicle, as set forth.

In testimony whereof I have signed my name to this specification in the presence of two subscribing witnesses.

JÜRGEN PETER LANGE.

Witnesses:
  THOS. A. W. DWYER,
  MARTHA LANGE.